United States Patent [19]

Bourgault et al.

[11] Patent Number: 4,762,183
[45] Date of Patent: * Aug. 9, 1988

[54] FARMING IMPLEMENT WITH ADJUSTABLE EARTHWORKING TOOL FRAMER

[75] Inventors: Francois P. Bourgault; Joseph L. Bourgault, both of St. Brieux, Canada

[73] Assignee: F. P. Bourgault Industries Cultivator Division Ltd., St. Brieux, Canada

[*] Notice: The portion of the term of this patent subsequent to Apr. 7, 2004 has been disclaimed.

[21] Appl. No.: 917,110

[22] Filed: Oct. 9, 1986

Related U.S. Application Data

[63] Continuation-in-part of Ser. No. 765,946, Aug. 15, 1985, Pat. No. 4,655,296.

[30] Foreign Application Priority Data

Feb. 15, 1985 [CA] Canada .................................. 474934

[51] Int. Cl.[4] ............................................. A01B 63/22
[52] U.S. Cl. .................................... 172/400; 172/413; 172/417; 280/43.13; 280/43.23
[58] Field of Search ............... 172/248, 310, 311, 400, 172/401, 413, 417, 421, 625; 280/43.13, 43.23

[56] References Cited

U.S. PATENT DOCUMENTS

| | | | |
|---|---|---|---|
| 3,091,476 | 5/1963 | Blake | 280/43.13 |
| 3,777,823 | 12/1973 | Holfeld | 172/328 |
| 4,655,296 | 4/1987 | Bourgault et al. | 172/400 |

*Primary Examiner*—Richard T. Stouffer
*Attorney, Agent, or Firm*—Laubscher & Laubscher

[57] ABSTRACT

The linkage mechanism between the front and the rear wheels of a farming implement includes a front and a rear arm the free ends of which suspend the respective wheels. Each arm has a transverse bracket near its other end. The bracket defines, at its free end, a pivot joint of a normally generally horizontal connecting rod whose other end is similarly connected to the bracket of the other arm. Each arm is mounted in a respective bearing for swinging about a point to raise or to lower the frame of the implement. The three pivot points associated with each arm define a respective linkage triangle. The geometry of the linkage triangles is developed from a reference triangle, divided by a median into two triangles of which one corresponds to one of the linkage triangles and the other corresponds to or is similar to the other one of said linkage triangles. The invention facilitates the designing of the linkage.

5 Claims, 6 Drawing Sheets

FARMING IMPLEMENT WITH ADJUSTABLE EARTHWORKING TOOL FRAMER

REFERENCE TO RELATED APPLICATION

This is a continuation-in-part application of our patent application Ser. No. 765,946, filed Aug. 15, 1985, issued Apr. 7, 1987 as U.S. Pat. No. 4,655,296.

BACKGROUND OF THE INVENTION

The present invention relates to an earth working device and in particular to a farming implement such as a cultivator or the like.

More specifically, the invention is directed to an improvement in the system for controlling the depth of penetration of earth by working tools on a farming implement and for raising the implement for transportation purposes or the like. The invention is explained with reference to an agricultural tillage implement such as a cultivator. However, it can be used with any other farming implement in which the control of the level or depth of penetration of the earth working tools is of the essence.

Many agricultural implements of the type including tilling shovels are known from prior art. They are usually towed by a tractor and can be divided into two basic groups from the standpoint of the way of securement to a tractor. The first group is more or less fixedly secured to the tractor such that when the tractor reaches an elevated position, the whole implement follows the inclination thus induced. The second group of the towed implement of this type utilizes so-called "floating hitch" wherein the front of the frame of the implement is provided with a pivotal or hinged securement of the towing bar whose opposite end is then secured to the tractor. The latter arrangement is typical by having a number of wheel subassemblies which include a set of front wheels and a set of rear wheels. The advantage of the "floating hitch" is in that the implement more closely follows all irregularities of the surface of a field and thus provides a more uniform depth of penetration of the earth by the tools.

It is one of the prerequisites of farming implements of this type that they be capable of becoming readily convertible from a transportation position, at which the earth working tools are lifted substantially above the ground, to a working position in which the frame of the implement with the tools is lowered such that the tools penetrate the soil to a predetermined depth. It is also important to assure that the operator of the tractor can readily adjust the instant depth of penetration of the soil by the earth working tools secured to the frame of the apparatus, during the operation.

A number of different ways of controlling the depth of penetration by the tools are known from prior art. They operate on hydraulic, mechanical or combined principles and utilize many different ways of obtaining as level an arrangement as possible. It is important not only to achieve proper maintaining of the frame of the implement at a horizontal level (thus securing uniform depth of penetration by the working tools), but also to ensure that the horizontal, levelled arrangement is retained in a fully raised position, in which the wings of an implement are folded into an upright position where virtually any misalignment of the front-rear level of the frame would be visible and unacceptable.

As regards prior art, reference may be had to the following patents utilizing the system of a floating hinge: U.S. Pat. No. 4,083,411 (van der Lely), Canadian Pat. No. 803,220 (Sokolik), and Canadian Pat. No. 727,392 (Telecky).

In Canadian Pat. No. 727,392, a triangular frame is provided with front and rear wheels. The lifting is achieved by an additional or supplementary frame, referred to as "lift frame", which is raised or lowered according to the instant need of the type of working the soil. The arrangement is disadvantageous since it does not allow for convenient levelling of the device in case of a front-rear misalignment or in case of a sideways misalignment. Generally the same disadvantages are encountered in the Sokolik device which also utilizes what amounts in effect to a sub-frame lifted or lowered by a hydraulic arrangement as the need arises. In the van der Lely U.S. Pat. No. 4,083,411, the depth of penetration is in fact controlled by a pilot wheel contacting the ground. A separate hydraulic mechanism is utilized for lifting and lowering the frame of the device from a transport position to an earth working position. The levelling of the frame transversely and longitudinally is cumbersome.

U.S. Pat. No. 2,682,153 issued June 29, 1954 to R. C. Fink, Sr. shows a trench roller having a wheel raising mechanism comprising a front arm and a rear arm linkage mechanism interconnected by a connecting rod to lower or to raise auxiliary wheels designed to ride in a trench. While Fink Sr. attempted to achieve raising and lowering the wheels in like amounts, it only refers to the proportioning of the linkage mechanism and otherwise presents a complex mechanism which, while being probably suitable for the purpose described, would not be accurate enough if used in farming implements.

SUMMARY OF THE INVENTION

It is an object of the present invention to provide an arrangement for a farming implement, whereby the levelling of the frame both longitudinally and transversely can be effected very conveniently by levelling the entire frame holding the earth working tools, utilizing reliable and structurally simple means for such operation and also providing an improved versatility of the design for different applications.

In general terms, the present invention provides a farming implement of the type including a frame section carrying a plurality of earth working tools and provided with ground wheel means secured to the frame section for allowing movement of same in a predetermined direction; towing bar means secured to said frame section at a front end thereof for a free pivotal movement about a generally horizontal, transverse axis, said ground wheel means being comprised of a plurality of ground wheel subassemblies, each ground wheel subassembly comprising, when viewed from one side of the implement: (a) front wheel means at the front end of the frame section, said front wheel means being connected with a free end of a longitudinal front suspension arm at a first pivot point, the other end of the front suspension arm being pivotable about a second pivot point coincident with a transverse, normally generally horizontal axis of front bearing means fixedly secured to the frame section; (b) front bracket means fixedly secured to the front suspension arm and having a free end provided with a first transmitting joint coincident with a forward end of a connecting rod, said first transmitting joint defining a third pivot point spaced from a reference plane coincident with the axis of said front bearing means and generally parallel with the axis of said connecting rod; (c) rear wheel means connected with a longitudinal rear suspension swing arm at a fourth pivot point near a free end of the swing arm, the other end of said swing arm being pivotable about a fifth pivot point coincident with a generally horizontal transverse axis of rear bearing means fixedly secured to the frame section; (d) rear bracket means fixedly secured to the swing arm and having a free end provided with a second transmitting joint coincident with a rear end of said connecting rod, said second transmitting joint defining a sixth pivot point spaced from said reference plane; (e) drive means operatively associated with said subassembly to selectively pivot said arms about said transverse axes of the front and rear bearing means to raise or to lower the frame; (f) said connecting rod extending in a direction generally from the front to the rear of the frame and being pivotally connected, at its respective ends, with said transmitting joints to transmit the pivotal motion of one of said arms to the other; (g) the said pivot points being so arranged that the raising of the front suspension arm results in the raising of the rear suspension swing arm and vice-versa; (h) said first, second and third pivot points defining, when the implement is viewed from said one side, a first triangle ABC; (i) said fourth, fifth and sixth pivot points defining, when the implement is viewed from said one side, a second triangle A'B'C'; (j) one of said first and second triangles being a right angled or an obtuse angled triangle, the other being an acute angled or an obtuse angled triangle, the geometry of said first and second triangles being developed by dividing a reference triangle AA'C by a median from the point C, into two triangles of which one is identical with said first triangle, ABC and the other is identical with or similar to the second triangle A'B'C'; (k) the second and third pivot points defining a line and the fifth and sixth pivot points also defining a line, each of which lines is disposed at no more than about 30° to a reference line coincident with one of the respective two pivot points and perpendicular to a line defined by the third and sixth pivot points when the implement is viewed from said one side, at any position between a fully raised and a fully lowered state of the frame.

In one embodiment, the arms are so arranged and disposed that they pivot in the same direction, both clock-wise or both anti-clock-wise, when the frame is raised, and vice-versa when the frame is lowered, when the implement is viewed from said one side.

In an alternative embodiment, the arms are so arranged and disposed that they swing in mutually opposite directions, one clock-wise, the other anti-clock-wise when the frame is raised, and vice-versa when the frame is lowered, when the implement is viewed from the one side.

In a preferred embodiment, the distance between the second pivot point and the third pivot point, is equal to the distance between the fifth and sixth pivot point. In other words, each of the first and the second triangles is identical in size and shape with the respective one of the two triangles obtained by the dividing of the reference triangle.

BRIEF DESCRIPTION OF THE DRAWINGS

The invention will now be described by way of preferred and exemplary embodiments with reference to the accompanying drawings wherein.

DESCRIPTION OF PREFERRED AND EXEMPLARY EMBODIMENTS

As mentioned above, the present invention is closely related to what is shown in our U.S. Pat. No. 4,655,296. In that patent, reference is made to a linkage arrangement having a defined geometry limitation of two right angled triangles. In some applications, the geometry or arrangement of the above patent may be disadvantageous if one or both of the right-angled triangles are to be avoided, for instance to accomodate a reinforcing part of the frame of the implement or for many other practical reasons.

Since the present invention is so closely related to our previous application which issued as the above U.S. patent, it will be useful to actually describe the present invention by way of comparing it with the features of our U.S. Pat. No. 4,655,296.

Figure 1:
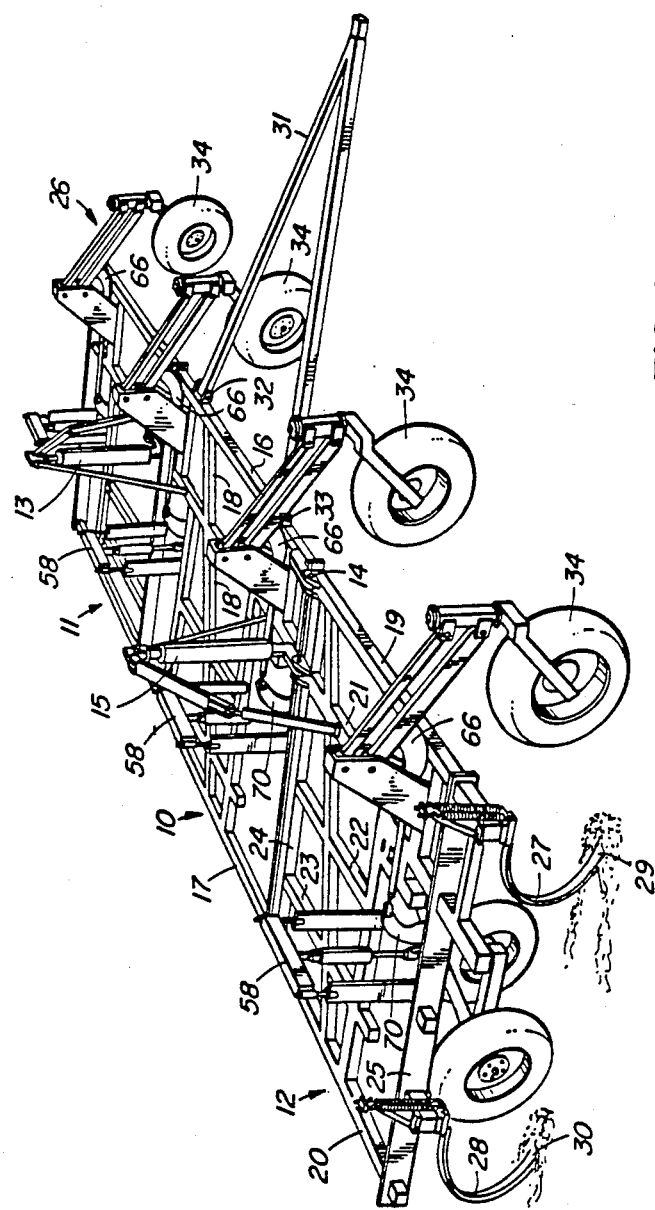
FIG. 1 is a simplified, diagrammatic perspective view of a farming implement of U.S. Pat. No. 4,655,296.

Turning firstly to the representation of FIG. 1, reference numeral 10 denotes a main frame disposed centrally of the implement and operatively associated with a left-hand side frame 11 and a right-hand side frame 12. The frame 11 is hingedly secured to the frame 10 for pivotal movement about a longitudinal axis, when the frame is to be transported on a highway or the like, in order to reduce the width at the left-hand side. The folding of the frame is effected by a hydraulic cylinder 13 arranged to lift the frame 11 to approximately an upright position and over the top of the central main frame 10. Similarly, the right-hand side frame 12 is hinged at 14 to the frame 10 for a folding which is normally effected by actuating a hydraulic cylinder 15. The folding of the side frames 11 and 12 is very well known in the art and does not in fact form a part of the present invention.

The main frame 10 includes a front transverse beam 16, a rear transverse beam 17 and appropriate number of reinforcement cross members such as cross member 18.

Figure 2:
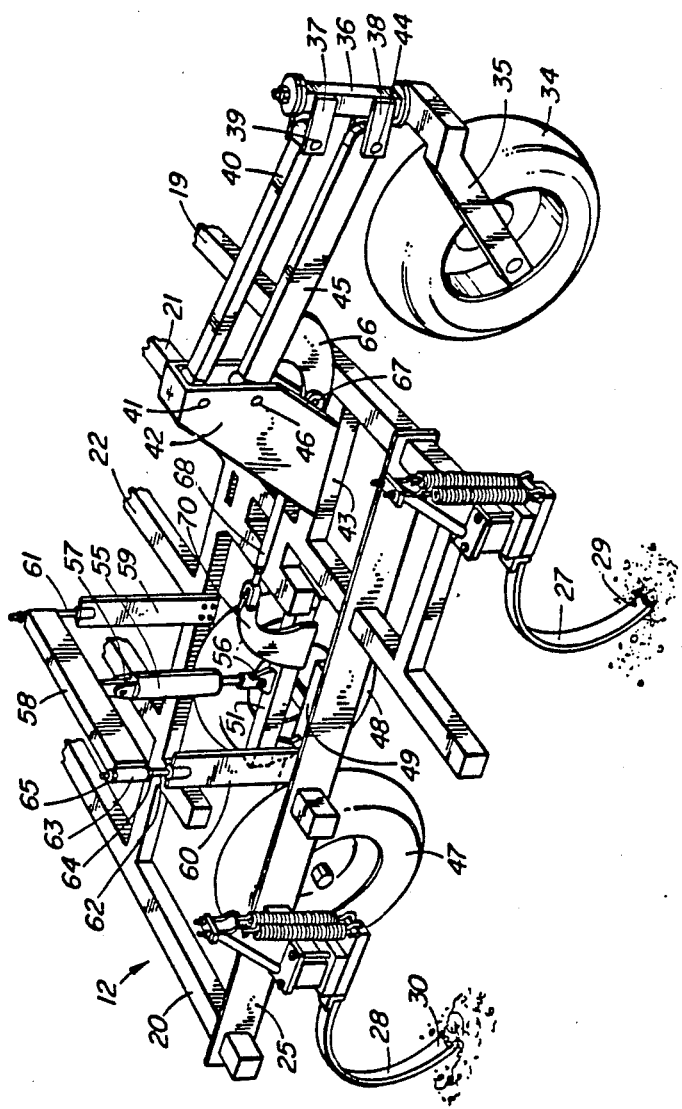
FIG. 2 is a simplified, diagrammatic partial view of what is shown in FIG. 1 but showing the arrangement of the forwardmost subassembly as viewed in FIG. 1.

Similarly, the right-hand side frame 12 includes a front transverse beam 19, a rear transverse beam 20 and a series of transverse beam members 21, 22 and 23, as well as longitudinal beam 24 at the hinge 14 and an outer longitudinal beam 25 FIG. 2.

It is to be noted at this point that the frame 11 at the left-hand side is identical to a mirror image of the frame 12 at the left-hand side. For the purpose of the present invention it is important to notice that in the fully unfolded state shown in FIG. 1, the frames 10, 11 and 12 form a rigid, singular "frame section" 10, 11, 12 carrying a plurality of earth working tools.

For the sake of simplicity, only two such earth working tools are shown, both of them secured to the right-hand side frame 12, it being understood that a large number of such tools is normally used in the implement in a number of transverse rows, from the right-hand side extreme at beam 19 of FIG. 1 to the left-hand side extreme thereof, beyond the extreme left-hand side wheel subassembly referred to with reference numeral 26. In the shown embodiment, the earth working tools are cultivator hoes 27, 28 the free ends or tips 29, 30 of which face forwards to penetrate earth at a predetermined depth, depending on the instant level of the frame section 10, 11, 12 relative to the ground. The subassembly 26 can also be referred to as being one of ground wheel means. The ground wheel means 26 is identical in its arrangement with the remaining three ground wheel means, of which two are operatively associated with the main frame 10, while one of each of the ground wheel means is associated with the left hand and right-hand side frame 11, 12, respectively. The ground wheel means allow the frame section 10, 11, 12 to be towed by a tractor at a tow bar 31 secured to the frame section 10, 11 and 12 by way of securement to the frame 10 at the front beam 16 thereof, for a "floating" pivotal movement about a transverse horizontal axis of the two coaxial hinges 32, 33.

As mentioned above, the embodiment in FIG. 1 has a total of four wheel subassemblies it being understood that a different number of wheel subassemblies can be utilized in accordance with the present invention, depending on the size of the implement.

The present invention is mainly concerned with the wheel subassembly and in particular with means for raising and lowering the frame section 10, 11, 12 by operating the wheel subassembly.

Reference may now be had to FIG. 2 which shows the wheel subassembly of the right-hand side frame 12. The wheel subassembly comprises a front wheel 34 which is mounted, by way of a fork element 35 to an upright journal housing 36, for pivotal movement about a vertical axis of elongation of the journal housing 36. The wheel 34 is thus operative as a castor wheel at the front of the frame section 12.

The journal housing 36 is provided with a pair of brackets 37, 38. A journal 39 connects the upper bracket 37 to a parallelogram link 40, whose opposite end is secured, by a pivot pin 41, to a mounting bracket 42 which is hollow and is fixedly secured, by welding, to a frame member 43 of the frame 12. Similarly, the bracket 38 is secured, by a pivot pin 44 to a forward end of a longitudinal front suspension arm 45 at a forward end point thereof. The forward end point is identical with the pivot pin 44. The rear end of the arm 45, in turn, is secured by a pivot pin 46 to the mounting bracket 42. Since, for al practical purposes, the mounting bracket 42 forms an integral part of the frame section 12, the pivot pin 46 can also be referred to as forming a preferred embodiment of "first bearing means fixedly secured to the frame section 10, 11, 12 and having a generally horizontal, transverse axis". The transverse axis, of course, is parallel with the axis of hinges 33, 32 shown in FIG. 1.

The wheel subassembly shown in FIG. 2 further includes rear wheel means which is comprised of a pair of wheels 47, 48, each secured for rotation at the ends of a walking beam 49 which, in turn, is freely pivotal about a pivot or mounting point 50 (FIG. 3) by which the beam 49 is secured to the back end (also referred to as "a first, free end") of a rear suspension or swing arm 51. The forward end of the rear suspension arm 51, in turn, is pivotably secured to the frame section 12 at a second bearing means 52 (FIGS. 3 and 4) for pivotal movement about a transverse axis.

Thus, the arm 51 can pivot in the second bearing 52 clockwise and counter clockwise to selectively bring the wheels 47, 48 to a different level relative to the frame 12 which determines the elevation 53 of the frame 12 (and thus of the tips 29, 30) above or below the ground 54. The movement of the arm 51 is effected by the hydraulic cylinder 55 pivotably secured to the arm 51 at a pivot 56 coincident with the free end of the piston rod of the hydraulic cylinder 55. The case of the cylinder 55, in turn, is secured pivotably at pivot 57 to a transverse beam 58 which is mounted to a pair of uprights 59, 60 fixedly secured to the frame section 12. A threaded stem 61, 62 is provided at the top of each of the uprights 59, 60. A pair of sleeves, (of which only sleeve 63 is visible in FIG. 2) is welded to each end of the beam 58 and is slidably received by the respective stem 61, 62. Below and above each sleeve is a pair of adjustment nuts 64, 65 by which the respective side of the beam 58 can be raised or lowered thus raising or lowering the elevation of the pivot 57 and, in turn, of the hydraulic cylinder 55 which is eventually transmitted to the instant position of the arm 51. The adjustment of the beam 58 is important for transverse levelling of the entire frame section 10, 12, 11.

The described arrangement of the hydraulic cylinder 55 can also be referred to, in general terms, as a preferred embodiment of "hydraulic cylinder drive means having one end pivotably secured to the frame section, the other end being pivotably secured to the rear suspension arm to selectively raise or lower same by pivoting it in said second bearing means".

Figure 3:
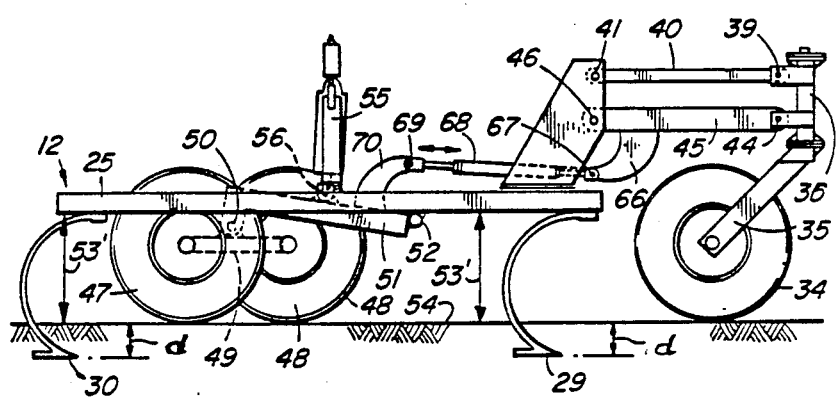
FIG. 3 is a diagrammatic side view taken from the bottom left corner of FIG. 1 and showing the geometry of the arrangement of U.S. Pat. No. 4,655,296.
Figure 4:
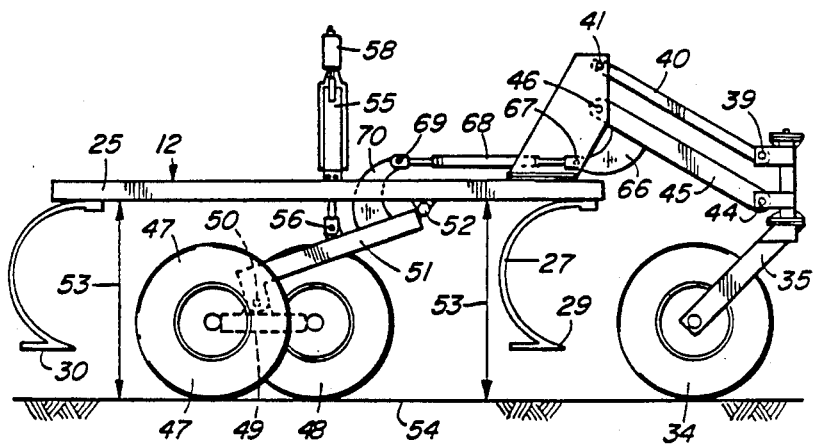
FIG. 4 is a diagrammatic side view of the implement similar to that of FIG. 3 but showing the frame of the implement in a raised position.

Turning now again to the front suspension arm 45, it is provided with an arcuately shaped bracket 66 welded to the arm 45. In the embodiment of FIGS. 3 and 4, the arcuate bracket 66 depends downwardly and rearwards from the arm 45. It is obvious, however, that mechanical equivalents exist which do not have to have this bracket turned downwardly and rearwards. At a pivot 67 (also referred to as "a forward pivot joint"), a connecting rod 68 is pivotably secured to the bracket 66. The rear end of the connecting rod 68 is secured by a rear pivotal joint 69 to a rear bracket 70 which is arcuate inversely to the orientation of the bracket 66 and is fixedly secured, e.g. by welding, to the arm 51 as best seen in FIGS. 3 and 4. It will be appreciated on review of FIG. 3 or 4 that, commencing from the state of FIG. 4, if the hydraulic cylinder 55 is contracted to produce a counter clockwise pivotal movement of the arm 51 relative to frame 12 about the second bearing means 52, it eventually reaches the state of FIG. 3 in which the arm 51 slopes slightly downwardly and forwardly, as opposed to the downwardly-rearward slope of the state at FIG. 4. The arcuate movement in clockwise direction of arm 51 in FIG. 4 is transmitted by the bracket 70 and the connecting rod 68 to a counter-clockwise pivoting movement of the front suspension arm 45 about the pivot pin 46.

In the embodiment shown, the angular displacement at the front suspension arm 45 is equal to the angular displacement of the trailing arm 51 as long as the preferred arrangement is maintained, whereby the triangles 52-50-69 and 46-44-67 are identical right-angled triangles. As best seen in FIG. 3, when the tips 29, 30 are at a depth d of about 2 cm to 20 cm, the rear pivotal joint 69 is at a twelve-o'clock position with respect to the pivot or second bearing means 52. In other words, the pivot 69 is generally vertically above 52. Similarly, the pivot 67 is vertically below the pivot 46, i.e. in an approximately six-o'clock position. The arrangement "vertically above" and "vertically below" is so designated only as an example. The arrangement is in fact more closely related to a transverse plane (i.e. a plane at right angles to the plane of view of FIGS. 3, 4, 6A and 6B) coincident with the axis of the rod 68 as seen in the side view. In the embodiment shown, the axis of the rod 68 is generally horizontal, even though a more or less inclined position may also be feasible in certain cases. This arrangement, coupled with the identity of the two triangles as referred to above, presents a suitable and proven arrangement. However this is not the only arrangement capable of providing a generally identical vertical displacement of the frame section 12 from the height 53 in FIG. 4 to the height 53' in FIG. 3. Once the working arrangement of FIG. 3 is achieved, the structural arrangement of the triangles as referred to above is preferably such that within the range between a fully raised position and a fully lowered position, in which the depth d of penetration of the tips 29, 30 below the ground level 54 is within approximately 2-20 cm, the pivot 69 remains within approximately eleven-o'clock and one o'clock positions (relative to pivot 52) while the forward pivot 67, remains between about seven o'clock and about five-o'clock position relative to pivot 46 and in relation to an imaginary reference line through point 46 and parallel with line 69-67 (which corresponds to the axis of the connecting rod 68). This relationship can be also defined by referring to the 30° limits as set forth in the second paragraph of the SUMMARY OF THE INVENTION, at the beginning of this specification.

Figure 5A:
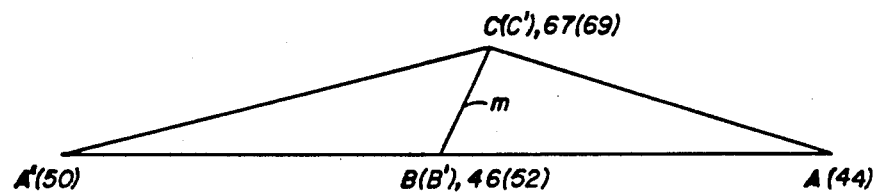
FIGS. 5A, 5B are diagrams showing the alternative geometry of the present invention.
Figure 5B:
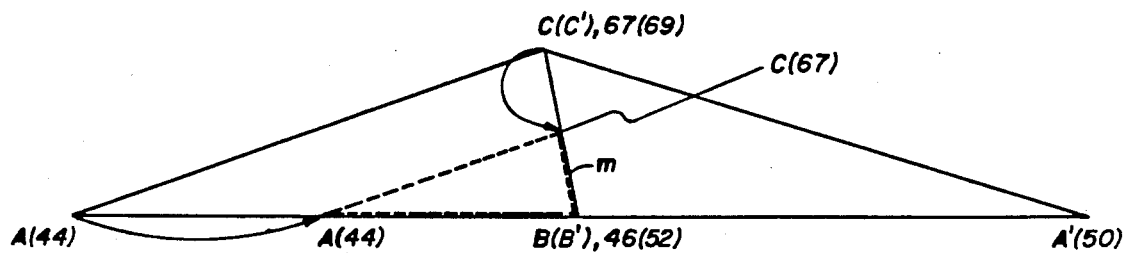
Figure 6A:
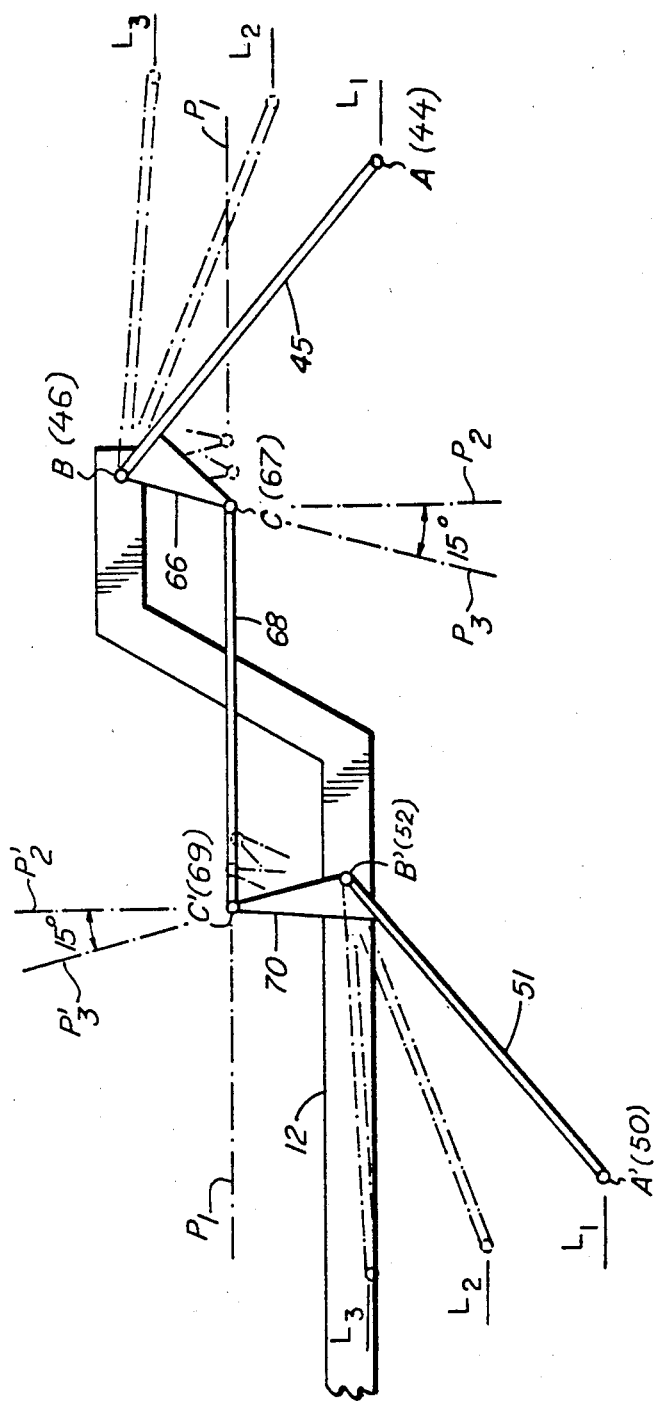
FIGS. 6A, 6B are substantially simplified diagrammatic representations of two embodiments of the present invention in a side view taken from the same side as in FIGS. 3 or 4.
Figure 6B:
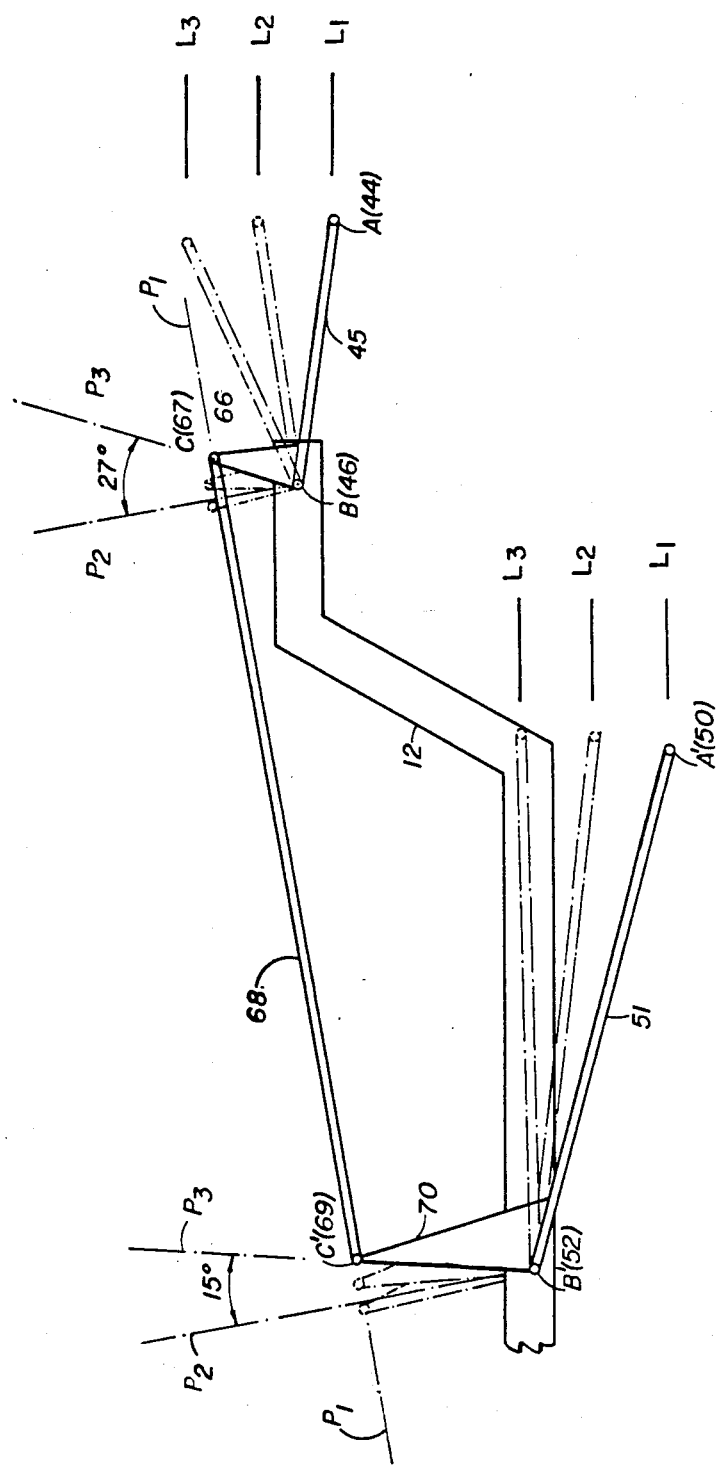

Turning now to FIGS. 5A and 5B, this is a geometric representation of the development of triangles suitable for the arrangement of the components of the present invention. This arrangement is shown and later described with reference to FIG. 6A and 6B. In each diagram of FIGS. 5A, 5B, a first triangle is shown which is designated with points A, B and C. In the arrangement of FIG. 6A or FIG. 6B, the points A, B and C correspond to pivots 44, 46 and 67, respectively. There is a second triangle in each of FIGS. 5A, 5B designated with points B', A' and C', which corresponds to pivots 52, 50 and 69, respectively, in the arrangement of FIGS. 6A, 6B. It can be seen from the drawing of FIG. 5A that both triangles ABC, A'B'C' are obtuse angled triangles. On the other hand, in FIG. 5B, the triangle ABC is acute angled while the triangle A'B'C' is obtuse angled, the obtuse angle being at the apex B'.

The geometry of the respective triangles ABC, A'B'C' is developed by dividing a reference triangle AA'C by a median m from the point C. It can be observed by comparing FIGS. 5A, 5B with FIGS. 6A, 6B that the median m corresponds to each of imaginary lines extending between pivot points 46-67 and 52-69. Assuming that the relationship between such points is maintained within the 30° limits referred to above (also designated as the eleven o'clock-one o'clock and/or five o'clock-seven o'clock position), the remaining sides of the first and second triangles provide instant reference to the desired length and orientation of the arms 45 and 51 as defined by points 44-46 and 50-52.

In one of the examples shown, (FIG. 6A), the length of th arms is equal. In another example (FIG. 6B) the arms 45, 51 have different length to show that it is not vital for the two triangles ABC and A'B'C' to be equal to the respective triangles as in FIG. 5A or FIG. 5B. It will suffice if one of the two triangles is only similar (i.e. having the same angles but different size) to the shown triangles. For instance, one may find it desirable to design the length between the points A', B' (i.e. the length of the rear arm 51) to be twice the length of the front arm AB.

As shown in FIG. 6B, the geometry is then modified by reducing the size of the first triangle ABC such that all its sides are one-half of the original triangle ABC. The change is conveniently carried out by moving each of points A, C, towards point B to arrive at the reduced-size triangle ABC shown in FIG. 5B in broken lines. In other words, the counterpart of the second triangle A'B'C' of FIG. 5B in the arrangement of FIG. 6B is not identical with, but is similar to the triangle ABC. As in the preceding example, it is necessary to stay within the 30° limits as referred to above.

As mentioned above, FIG. 5B shows an embodiment of the reference triangle AA'C wherein the first and second triangles ABC, A'B'C' are both obtuse angled. A special case may exist (not shown) wherein one of the triangles is right-angled (at the point C) and the other is obtuse angled (at the point B'). In practice, one of the first and second triangles is usually given by structural limitations of the device in which the raising mechanism is to be installed. Such limitation is usually due to the structure of the frame, to the desired position of the front or rear wheels and to many other practical considerations in designing a farming implement. It will be appreciated in this context that the arrangement of two identical right-angled triangles shown in FIGS. 3 and 4 is in fact a special case of the geometry of FIGS. 5A or 5B wherein the reference triangle is an isosceles or equilateral triangle, such that the two angles at point B of the reference triangle would be right angles.

It will be appreciated that the present invention provides simple means whereby the geometry of the relationship between the two critical triangles used in the lifting mechanism can be readily modified within a great number of different shapes without having to adhere to the right angled arrangement as described in the above U.S. patent.

FIGS. 6A and 6B also show another feature referred to above, namely that the location of the bracket 66 relative to the arm 45 or of the bracket 70 relative to the swing arm 51 can also be modified, depending on the relative orientation of the arms 45 and 51.

In FIG. 6A, the front arm 45 and the rear arm 51 are designed to have different inclination during at least a part of the raising or the lowering cycle. Therefore, the associated brackets 66, 70 must be located one above and the other below the associated arm 45 or 51. The raising of the rear swing arm 51 will result in the movement of the connecting bar 68 to the right to move the front arm 45 in the same sense, i.e. counter-clockwise or upwards. If desired, the actual orientation of the bracket 66, 70 can be reversed such as to make the bracket 66 disposed above the arm 45 while the bracket 70 would be below the arm 51. The actual choice depends on structural limitations and the best utilization of space in the structure of the farming implement.

If, on the other hand, the implement requires that the slope of the arms 45, 51 be in generally the same direction of sense as shown in FIG. 6B, the brackets 66, 70 must be arranged to the same side of the arms 45, 51, i.e. either both above or both below the respective arm. In FIG. 6B, with the implement raised, both arms 45, 51 slope downwardly and forwards and the brackets 66, 70 both extend upwards of the arms 45, 51.

It will be obvious to those skilled in the art that many other modifications of the mutual arrangement of the arms 45 and 51 may exist. For instance, if it is desired that the brackets 66, 70 be mounted to the same side of the arms 45, 51 it may be of advantage, in some instances, to modify the arrangement of FIG. 6B such that both arms 45 and 51 would slope downwardly and backwardly.

FIGS. 6A and 6B also show another aspect of the invention. Reference letters $P_1$ designate parallel transverse planes (at right angles to the plane of FIGS. 6A, 6B), each coincident with the axis of the respective connecting rod 68. Reference planes $P_2$, $P'_2$ coincide with the points B, B' and are perpendicular to the respective plane $P_1$. $P_3$, $P'_3$ are third transverse planes coincident with the respective points B'-C'. The planes $P_3$, $P'_3$ present the extreme position of the rod 68 at which the end points A, A' of the arms 45, 51 are at their lowermost level relative to frame 12. In other words, the full line representation of arms 45, 51 in FIG. 6B presents a fully raised position of the frame 12 which is maintained horizontal. The angle at which the transverse planes $P_2$, $P_3$ intersect each other is about 27° (approx. 1 o'clock position). That angle changes as the arm 45 moves its free end point A to levels $L_2$, $L_3$, but according to the invention, it stays within about 30° to each side of the plane $P_2$, i.e. between 11-o'clock and 1-o'clock positions. The same rule applies to the position of the planes $P'_2$, $P'_3$, where the corresponding extreme angle is shown as being about 15°, i.e. half way between 12-o'clock and 1-o'clock position, well within the limits of 30°. The mutal relationship shown in FIG. 6A has the same extreme angle of 15° at both ends.

If one refers to the side view of FIGS. 6A, 6B, one may refer to planes $P_1$, $P_2$, $P_3$ and $P'_1$, $P'_2$, $P'_3$ as lines showing the same angular relationship. Thus, one might say, referring, for example, to FIG. 6B, that the second and third pivot points BC and the fifth and sixth pivot points B'C' define each a line $P_3$, $P'_3$ disposed at no more than about 30° to a reference line $P_2 P'_2$ coincident with one of the respective pivot points B' or B and perpendicular to the elongation $P_1$ of said connecting rod 68, at any position between a fully raised and fully lowered state of the frame 12.

The present invention thus presents an improvement whereby the structural limitations of both triangles to be right angled, originally assumed to be necessary have been removed together with other limitations, while retaining the high accuracy of the leveled arrangement of the frame 12 within the critical limits of the uppermost and lowermost positions of the frame.

The implement of the present invention is normally manufactured such that the frame section 12 maintains horizontal longitudinal position if the connecting rod 68 is extended to such a degree as to maintain the twelve o'clock and six o'clock positions at the rear and at the front, as referred to above. At this horizontal position all of the tips 29, 30 (and also the tips of the remaining tools not shown) are at the same depth 70. If for some reason there is a minor discrepancy, the connecting rod 68 can be lengthened or shortened. As best seen from FIGS. 3 and 4, the connecting rod 68 is comprised of a central sleeve which is threaded at its ends and which is provided at each end with a threaded stem connecting the central sleeve with the respective pivots 67, 69. Once the adjustment of the connecting rod is made (staying within the tolerances as referred to above), the implement is ready for use and will stay in a longitudinally horizontal arrangement at any practical level, as long as the implement moves on a generally horizontal ground.

The design of the implement also includes means for maintaining the entire frame section 10, 11, 12 horizontal transversely. Any deviations in this respect can be adjusted by manipulating the nuts 64, 65 thus raising or lowering the respective beams 58 at the desired side. Again, once the adjustment of the position of the beam is made, the implement stays horizontal transversely.

The advantage of the present design is in an extreme simplicity of the mechanism and of its designing. Since the cylinders 55 are interconnected in series by way of the well known slave cylinder system, any manipulation of the hydraulic system to raise or lower the frame will result in an equal increase or decrease of the extension of each of the hydraulic cylinders 55.

The above embodiments are preferred and are believed to be the best way of carrying out the invention. This is not to say that there would not be other embodiments in which the magnitude of certain elements of the geometry of the present invention would be modified, for instance, by shortening the sides of one of the two triangles. Such and other modifications, even though not expressly described above, still fall within the scope of the present invention as recited in the accompanying claims.

We claim:

1. A farming implement including a frame section carrying a plurality of earth working tools and provided with ground wheel means secured to the frame section for allowing movement of same in a predetermined direction; front and rear bearing means fixedly secured to the frame section at the front and rear portions thereof, respectively; towing bar means secured to said frame section at a front end thereof for free pivotal movement about a generally horizontal, transverse axis, said ground wheel means being comprised of a plurality of ground wheel subassemblies, each of said ground wheel subassemblies comprising, when viewed from one side of the implement;
    (a) front wheel means at the front end of the frame section, said front wheel means being connected with a free end of a longitudinal front suspension arm at a first pivot point, the other end of the front suspension arm being pivotally connected with the front bearing means at a second pivot point corresponding with a transverse generally horizontal axis of the front bearing means;
    (b) front bracket means fixedly secured at one end with said front suspension arm, the other end of said front bracket means including a first transmitting joint;
    (c) a connecting rod extending between the front and rear portions of the frame section, the front end of said connecting rod being pivotally connected with said first transmitting joint of said front bracket means, said first transmitting joint defining a third pivot point in a plane containing the axis of said connecting rod and spaced from a reference plane containing the horizontal axis of the front bearing means;

(d) rear wheel means connected with a longitudinal rear suspension swing arm at a fourth pivot point near a free end of the swing arm, the other end of said swing arm being pivotally connected with the rear bearing means at a fifth pivot point corresponding with a generally horizontal transverse axis of the rear bearing means;

(e) rear bracket means fixedly secured at one end with said swing arm, the other end of said rear bracket means including a second transmitting joint pivotally connected with the rear end of said connecting rod, said second transmitting joint defining a sixth pivot point spaced from said reference plane;

(f) drive means operatively associated with each of said subassemblies to selectively pivot said arms about said transverse axes of the front and rear bearing means to selectively raise and lower the frame, said connecting rod transmitting the swing pivotal movement of one of said arms to the other via said transmitting joints;

(g) the pivot points being so arranged that the raising of the front suspension arm results in the raising of the rear suspension swing arm and vice-versa;

(h) said first, second and third pivot points defining, when viewing the implement from said one side, a first triangle ABC;

(i) said fourth, fifth and sixth pivot points defining, when the implement is viewed from said one side, a second triangle A'B'C';

(j) one of said first and second triangles being one of a right and obtuse angled triangle, the other being one of an acute and obtuse angled triangle, the geometry of said first and second triangles being developed by dividing a reference triangle AA'C by a median from the point C, into two triangles of which one is identical with said first triangle ABC and the other is similar to said second triangle A'B'C';

(k) the second and third pivot points and said fifth and sixth pivot points each defining a line which is disposed at no more than about 30° to a reference line through one of the respective two pivot points and perpendicular to a line defined by the third and sixth pivot points when the implement is viewed from said one side, at any position between a fully raised and fully lowered state of the frame.

2. An implement as claimed in claim 1, wherein, viewing the implement from one side thereof, the arms are so arranged and disposed that they swing in the same direction, which same direction is one of both clock-wise or both anti-clock-wise, when the frame is raised, and vice-versa when the frame is lowered.

3. An implement as claimed in claim 1, wherein, viewing the implement from one side thereof, the arms are so arranged and disposed that they swing in mutually opposite directions, one clock-wise, the other anti-clock-wise when the frame is raised, and vice-versa when the frame is lowered.

4. An implement as claimed in claim 2, wherein the distance between the second pivot point and the third pivot point, is equal to the distance between the fifth and sixth pivot points.

5. An implement as claimed in claim 3, wherein the distance between the second pivot point and the third pivot point, is equal to the distance between the fifth and sixth pivot points.

* * * * *